Patented May 16, 1933

1,908,817

UNITED STATES PATENT OFFICE

EDGAR C. BRITTON, SHAILER L. BASS, AND NORMAN ELLIOTT, OF MIDLAND, MICHIGAN, ASSIGNORS TO THE DOW CHEMICAL COMPANY, OF MIDLAND, MICHIGAN, A CORPORATION OF MICHIGAN

PROCESS FOR ISOLATING AND PURIFYING HYDROQUINONE

No Drawing.    Application filed August 3, 1931. Serial No. 554,944.

The present invention concerns a new process for separating hydroquinone in a substantially pure form from an aqueous solution thereof which may also contain related compounds, such as pyrocatechol, resorcinol, phenol, halogenated phenols, etc.

Methods usually employed for accomplishing the above mentioned separation either involve extracting hydroquinone from an aqueous solution thereof with ether or other solvent, or involve oxidizing hydroquinone to quinone with ferric chloride, extracting the quinone with a suitable solvent and subsequently reducing the quinone to hydroquinone. In the former method, the loss of organic solvent is considerable, the use thereof is hazardous, and a complete separation is not effected. In the latter method, the numerous steps and reagents required are costly and proper control is difficult.

We have found that a practically pure amine salt of hydroquinone may be precipitated from a nearly neutral (pH range of 5.0 to 9.0) aqueous solution of the latter, which solution may also contain related compounds such as pyrocatechol, resorcinol, chlorinated phenols, etc., by treating such solution with an aromatic amine such as the following:—aniline, para-toluidine, 2.4-dimethyl-aniline, para-anisidine, para-phenetidine, beta-naphthylamine and para-phenylene-diamine. The salt of hydroquinone so obtained may be decomposed with an acid or base having a strength greater than that of hydroquinone or the aromatic amino constituent, respectively, and the hydroquinone may be recovered in any of the usual ways. We have found, however, that certain amine salts of hydroquinone, such as the aniline, para-toluidine and 2.4-dimethyl-aniline salts, may be more conveniently and economically dissociated into the free phenolic and amino compounds simply by heating such salt in an organic solvent having a boiling point of about 80° C. or higher in which said salts and the free amino compounds derivable therefrom are relatively soluble, but in which free hydroquinone itself is relatively insoluble. Among the various organic solvents which may suitably be adapted to the above usage may be mentioned benzene, toluene, monochloro-benzene, ortho-dichloro-benzene, 1.2.4-trichlorobenzene, ethylene chloride, propylene chloride, etc.

Our new process is especially adapted to the isolation and purification of hydroquinone from alkaline solutions of the same, as obtained through the alkaline hydrolysis of mono-halogenated phenol. The reaction liquor may be brought to a nearly neutral condition (pH value of 5.0 to 9.0) through treatment thereof with an acid such as sulphuric or hydrochloric acid, and the amine salt of hydroquinone precipitated by adding one of the aforementioned aromatic amino compounds to the solution. It has been found, however, that such practice yields a hydorquinone salt which is discolored appreciably, although it may be practically pure in composition. The hydroquinone subsequently recovered from that salt is also discolored. We have found that when a solution of hydroquinone is acidified to a pH value of 5.0 to 7.0 with sulphur dioxide, the hydroquinone salt precipitated from the slightly acid solution is pure white in color and the free hydroquinone subsequently recovered from such salt is likewise white. Because of the tendency of sulphurous acid solutions to attack iron, it is advisable, when using iron apparatus, to neutralize the aforementioned alkaline hydrolysis solution with sulphur dioxide only to a pH value of 7.0 to 9.0 prior to forming the amine salt of hydroquinone in the same.

The salt of hydroquinone formed under such conditions is practically white in color and the hydroquinone recovered therefrom is of excellent quality. Our invention, then, consists in a new process for separating substantially pure hydroquinone from an aqueous solution of the same, which solution may also contain certain related compounds, such as pyrocatechol, resorcinol, phenol and halogenated phenols as well as various other soluble impurities that do not form insoluble salts with the amino compound used, such process being hereinafter fully described and particularly pointed out in the claims.

The following description sets forth a general mode of procedure in which the principle of our invention may be practiced, it being understood, however, that such detailed procedure is not to be construed as a limitation on the invention.

An alkaline solution containing 1 mole of hydroquinone, preferably in a concentration of from 2 to 6 per cent, and which may also contain impurities such as pyrocatechol, resorcinol, phenol, halogenated phenols and other soluble compounds that do not form slightly soluble salts with the amino compound thereinafter added, is acidified with sulphur dioxide to a pH value of from 5.0 to 9.0, and substantially 2 moles of a primary aromatic amino compound, such as aniline, para-toluidine, 2.4-dimethyl-aniline, para-anisidine, para-phenetidine, para-phenylene-diamine, or beta-naphthylamine is then added for each mole of hydroquinone present in the solution, the latter being maintained at a temperature below 100° C. during such treatment. Upon cooling the solution to room temperature, the amine salt of hydroquinone is precipitated in good yield and may be removed from the mixture in a substantially pure form. Hydroquinone may be liberated from the salt so formed by treatment with a strong acid or base, but in some instances it may be directly liberated therefrom by refluxing a nearly saturated solution of the salt dissolved in a suitable organic solvent for a brief period of time (preferably from 5 to 30 minutes), then cooling the reaction mixture to room temperature and filtering the precipitated hydroquinone therefrom. The product from the last described operation is usually obtained as white crystals having a melting point of 170° to 170.5° C. and in a yield of from 96 to 100 per cent of theoretical, based on the amount of salt used. The aromatic amino compound used in forming the above mentioned salt may be recovered in any of the usual ways, e. g. by fractionally distilling the mother liquor from which the purified hydroquinone was separated.

Several of the various ways in which the principle of our invention may be practiced are described in the following examples.

*Example 1*

To a solution containing 25 grams (0.227 mole) of hydroquinone dissolved in 500 cubic centimeters of water was added, slowly and with stirring, 43.6 grams (0.47 mole) of aniline. The solution was then cooled to 15° C. and 67.3 grams of aniline salt, slightly yellowish in color, filtered therefrom. The slightly moist product was then dissolved in 1200 cubic centimeters of hot monochlorobenzene and the solution distilled until the material distilling over was free of moisture. The solution was then refluxed during a period of approximately 15 minutes and finally cooled to room temperature. Hydroquinone, slightly yellowish in color and having a melting point of 169° to 170° C. separated therefrom in a yield of 24.3 grams or 97 per cent of theoretical, based on the hydroquinone used.

*Example 2*

One gram molecular weight of para-bromophenol was heated in an autoclave with a 10 per cent solution of sodium hydroxide containing 8 moles of the latter at a temperature of 125° C. during a period of 1 hour, 70 per cent of the para-bromo-phenol being thereby hydrolyzed to hydroquinone. Sulphur dioxide was then passed into the reaction solution until the latter had a pH value of between 5.0 and 7.0. The solution was then treated with a slight excess of aniline over that required to combine with the hydroquinone present and the latter substance recovered from the precipitated salt in a way similar to that described in Example 1. The product was obtained as pure white crystals having a melting point of 170° C. The yield was 65 per cent of theoretical, based on the quantity of para-bromo-phenol used and 93 per cent of theoretical, based on the quantity of hydroquinone formed through hydrolysis.

*Example 3*

To a solution containing equimolecular quantities of hydroquinone and pyrocatechol, each in 5 per cent concentration, was added a 6 per cent excess of aniline over the amount required to combine with the hydroquinone present. Hydroquinone was recovered from the precipitated salt in a way similar to that described in Example 1. The product was obtained, in a yield of 83 per cent of theoretical, based on the quantity of hydroquinone orginally used, as slightly yellowish crystals having a melting point of 170° C. Upon concentrating the aqueous mother liquor, from which the aforementioned aniline salt was precipitated, to one-half its original volume and retreating it in the above described way, the total yield of recovered hydroquinone was increased to practically 93 per cent of theoretical.

*Example 4*

The experiment described in Example 3 was repeated, using, however, a solution containing hydroquinone and resorcinol in the concentrations stated. The yield of aniline salt of hydroquinone was 83 per cent of theoretical, based on the quantity of hydroquinone used. Retreatment of the aqueous mother liquor, in a way similar to that described in Example 3, increased the total yield of hydroquinone to substantially 93 per cent of theoretical.

*Example 5*

To a solution containing equimolecular quantities of hydroquinone, resorcinol, and pyrocatechol, each in 5 per cent concentration, was added a 6 per cent excess of aniline over the amount required to combine with the hydroquinone present. The solution was then cooled to room temperature and hydroquinone recovered from the precipitated salt in a way similar to that described in Example 1. The product was obtained, in a yield of 75 per cent of theoretical, as slightly yellowish crystals having a melting point of 170° C.

*Example 6*

Sulphur dioxide was passed into a solution containing 25 grams (0.227 mole) of hydroquinone dissolved in 475 grams of water until the solution had a pH value of between 5.0 and 7.0. The solution was then heated to 60° C. and 50.2 grams (0.468 mole) of para-toluidine added with stirring. Upon cooling the solution to room temperature, the para-toluidine salt of hydroquinone crystallized as white leaflets, having a melting point of approximately 99° C. The yield of hydroquinone salt was 61.8 grams or 84 per cent of theoretical.

The salt was dissociated into its constituents by refluxing a solution containing the same in 10 times its weight of mono-chloro-benzene during a period of 15 minutes and then cooling the mixture to room temperature. The yield of pure, white hydroquinone, having a melting point of 170.5° C., was 83 per cent of theoretical, based on the amount of hydroquinone present in the original solution, and 98.8 per cent of theoretical, based on the quantity of toluidine salt dissociated.

*Example 7*

A solution containing 11.0 grams (0.100 mole) of hydroquinone dissolved in 500 cubic centimeters of water was acidified with sulphur dioxide to a pH value of between 5.0 and 7.0. The solution was warmed to 40° C. and 25 grams (0.205 mole) of meta-xylidine (2.4-dimethyl-aniline) was added with stirring. Upon cooling the mixture to 15° C., filtering and drying the product under vacuum, there was obtained 29.0 grams (0.083 mole) or 83 per cent of the theoretical yield of meta-xylidine salt of hydroquinone as glistening white leaflets having the melting point 95° to 96° C.

Five grams of the above mentioned salt of hydroquinone was refluxed, during a period of about 5 minutes, with 100 grams of monochloro-benzene. Upon cooling the reaction mixture to room temperature and filtering, there was obtained 1.6 grams (0.145 mole) or 99.5 per cent of the theoretical yield of hydroquinone, based on the amount of salt used.

*Example 8*

A solution containing 25 grams (0.227 mole) of hydroquinone dissolved in 475 grams of water was acidified with sulphur dioxide to a pH value of between 5.0 and 7.0. The solution was stirred and 64.2 grams (0.468 mole) of para-phenetidine added at room temperature. The mixture was cooled to 10° C., and the product separated therefrom as large white leaflets, having a melting point of approximately 109° to 110° C. The yield of hydroquinone salt was 82.2 grams or 94 per cent of theoretical.

Attempts to dissociate the salt into free hydroquinone and para-phenetidine by refluxing the former in chloro-benzene, ortho-dichloro-benzene and 1.2.4-trichloro-benzene were unsuccessful. Pure hydroquinone, having a melting point of 170° C., was recovered from the above described para-phenetidine salt thereof, by treating the latter in the following ways:—

(A) In 1 liter of a caustic alkali solution containing 8.0 grams (0.200 mole) of sodium hydroxide was dissolved 38.4 grams (0.100 mole) of the para-phenetidine salt of hydroquinone. The solution was steam distilled until 4 liters of distillate was collected. From the distillate, 24.3 grams (0.178 mole) or 88.7 per cent of the theoretical yield of para-phenetidine was obtained. The residual liquor remaining after the steam distillation was acidified with sulphur dioxide, extracted with ether, the latter removed by vaporization and the residue recrystallized from monochloro-benzene. There was obtained 4.5 grams or 41 per cent of the theoretical yield of hydroquinone.

(B) In a warm solution (about 60° C.) containing 20 grams (0.210 mole) of concentrated sulphuric acid in 1 liter of water was dissolved 38.4 grams (0.100 mole) of the para-phenetidine salt of hydroquinone. The solution was cooled to room temperature, extracted with ether, the extract evaporated to dryness and the residue recrystallized from monochloro-benzene. There was obtained 6.8 grams, or 62 per cent of the theoretical yield of hydroquinone. The aqueous solution remaining after the ether extraction was made alkaline with sodium hydroxide, steam distilled and 17 grams, or 62 per cent of the theoretical yield of para-phenetidine recovered from the distillate through extracting the latter with ether.

Example 9

A solution containing 20 grams (0.18 mole) of hydroquinone dissolved in 780 cubic centimeters of water was heated to 85° C. and then acidified with sulphur dioxide to a pH value of 5.0 to 7.0. While maintaining the solution at the temperature 85° C., 46 grams (0.37 mole) of para-anisidine was added with stirring. After solution was complete, the mass was cooled to 20° C., and the para-anisidine salt of hydroquinone, which separated, was filtered therefrom. The yield of product was 57.8 grams (0.16 mole) or 89.3 per cent of theoretical.

The salt could not be decomposed by boiling the same in organic solvents, but hydroquinone and para-anisidine could be recovered therefrom in ways similar to those described in Example 8.

Example 10

A solution containing 14.5 grams (0.132 mole) of hydroquinone dissolved in 500 cubic centimeters of water was acidified with sulphur dioxide to a pH value of between 5.0 and 7.0. To the solution was added 26.5 grams (0.245 mole) of para-phenylene diamine and the mixture heated to boiling for about 15 minutes, then filtered hot. Upon cooling the filtrate to room temperature, 26.2 grams of the para-phenylene-diamine salt of hydroquinone separated as purple colored flakes having a melting point of 201° to 202° C. The yield of hydroquinone salt was 91 per cent of theoretical, based on the amount of hydroquinone used. The salt could not be dissociated into its constituents by heating the same in organic solvents, but hydroquinone and para-phenylene-diamine could be recovered from the salt by following procedure similar to that described in Example 8.

Example 11

A solution containing 9.2 grams (0.084 mole) of hydroquinone dissolved in 500 cubic centimeters of water was acidified with sulphur dioxide to a pH value of between 5.0 and 7.0. To the solution was added 24 grams (0.168 mole) of beta-naphthylamine, and the mixture was stirred and heated until the amine was dissolved. Upon cooling the solution to room temperature the beta-naphthylamine salt of hydroquinone separated as leaflets, slightly pink in color and having a melting point of 144° to 145° C. The yield of salt was 26.8 grams or 86 per cent of theoretical. Hydroquinone and beta-naphthylamine could not be recovered from the product through heating the latter in organic solvents, but such result could be accomplished in ways similar to those described in Example 8.

Example 12

A solution containing 346 grams (2 moles) of para-bromophenol dissolved in 1867 grams (7.0 moles) of 15 per cent sodium hydroxide solution was heated in a copper lined bomb at a temperature of 120° C. during a period of 2 hours. Titration of an aliquot portion of the reaction mixture for bromide proved the hydrolysis to have been 76.2 per cent complete, based on the quantity of para-bromophenol used. The reaction mass was then treated with sulphur dioxide until it had a pH value between 7.0 and 9.0. Next it was steam distilled to remove unreacted para-bromophenol, 59.0 grams of the last mentioned material being recovered through extraction of the distillate with carbon tetrachloride and subsequent fractional distillation of the extract. The aqueous liquor remaining after the steam distillation was treated, at a temperature between 40° and 50° C., with 208.5 grams of aniline (2 molecular equivalents of aniline for each molecular equivalent of hydroquinone in solution). The mixture was next cooled to 15° C., the aniline salt of hydroquinone filtered therefrom, and the latter dissolved in 4 liters of monochloro-benzene. The latter solution was distilled until water no longer distilled over with the solvent, the residual liquor filtered while hot and 79.7 grams of hydroquinone, nearly white in color and having the melting point 170.5° C., crystallized from the filtrate upon cooling the latter to room temperature. The mother liquor was distilled through a fractionating column until the residual liquor had a volume of about 500 cubic centimeters. After cooling the latter to room temperature, an additional 10.8 grams of hydroquinone was filtered therefrom. The total yield of hydroquinone was 90.5 grams or 73 per cent of theoretical, based on the amount of hydroquinone formed through hydrolysis of para-bromo-phenol. The monochloro-benzene, from which the purified hydroquinone was filtered, was fractionally distilled and 80.1 grams of aniline recovered therefrom.

The residue, which had been filtered from the hot monochloro-benzene reaction mixture prior to crystallization of purified hydroquinone therefrom, was combined with the aqueous liquor from which the aforementioned aniline salt of hydroquinone had been filtered. The resultant liquor was evaporated, under reduced pressure, to a volume of 1060 cubic centimeters. It was then treated with 53 grams of aniline and the salt of hydroquinone, so formed, filtered therefrom. The salt was decomposed through procedure similar to that described above and an additional 11.5 grams of purified hydroquinone obtained. The total yield of purified hydroquinone was 102 grams or 82.6 per cent of theoretical, based on the amount of hydroquinone formed during the previously mentioned hydrolysis.

Example 13

The following description illustrates the advantage of using sulphur dioxide, rather than other mineral acids, in acidifying aqueous solutions of hydroquinone to the proper point before forming amino salts of the latter in such solution.

Three solutions were prepared, each of which contained 27.5 grams of hydroquinone and 20 grams of sodium hydroxide dissolved in 530 grams of water. The solutions were treated separately in the following ways:—

(A) One solution was acidified to a pH value of 6.0 to 7.0 with 5 normal hydrochloric acid and thereafter treated, at room temperature or slightly above, with a 5 per cent excess of aniline over that required to combine with the hydroquinone present. The aniline salt of hydroquinone was precipitated in a yield of 87.5 per cent theoretical. The salt had the correct melting point of 89°–90° C., but was light brown in color.

(B) The second solution was acidified to a pH value of from 6.0 to 7.0 with 5 normal sulphuric acid and the solution subsequently treated in the way described in part "A" above. The salt was obtained in a yield of 87.5 per cent of theoretical as light brown crystals having a melting point of 89°–90° C.

(C) The third solution was acidified to a pH value of from 6.0 to 7.0 with sulphur dioxide gas and subsequently treated in the way described in part "A". The aniline salt of hydroquinone was obtained in a yield of 87.5 per cent of theoretical as pure white crystals having a melting point of 89°–90° C. The crystalline product remained white after long exposure to light and air.

Example 14

The following table shows the smallest amounts of various solvents found suitable for dissociating 50 grams samples of the dry normal aniline salt of hydroquinone into its constituents through the aforementioned heating operation and the yields of hydroquinone obtained therefrom.

Our process may be operated under conditions other than those previously described. For instance, while it is preferable that the amine salt of hydroquinone be formed from solutions which contain from 2 to 6 per cent of hydroquinone, it may be formed from more dilute solutions, or, again, it may be formed by treating a saturated aqueous solution, containing an excess of solid hydroquinone suspended therein in the way previously described. Also, it has been stated that certain amine salts of hydroquinone are most suitably dissociated into hydroquinone and the free amino compound by refluxing a nearly saturated solution of the salt dissolved in a suitable organic solvent, and then cooling the resulting mixture. However, more dilute solutions of the salt may be treated in a similar way and the free hydroquinone be recovered therefrom. In the latter case, however, the yield of recovered hydroquinone is less than that obtained when a saturated solution of salt is used.

Table

| Inert solvent used | B. P. solvent °C. | Weight of solvent used in grams | Weight obtained grams | Hydroquinone percentage yield | M.P. of hydroquinone recovered °C. |
|---|---|---|---|---|---|
| Benzene | 79.6 | 3,000 | 17.2 | 92.5 | 170.5 |
| Monochloro-benzene | 132.0 | 500 | 17.0 | 91.4 | 170.5 |
| Ortho-dichloro-benzene | 179.0 | 500 | 17.0 | 91.4 | 170.5 |
| Toluene | 110.7 | 1,000 | 18.4 | 99.0 | 170.5 |
| Ethylene chloride | 83.7 | 1,000 | 17.0 | 91.4 | 170.5 |
| Propylene chloride | 96.8 | 1,500 | 16.8 | 90.3 | 170.5 |

Other modes of applying the principle of our invention may be employed instead of those explained, change being made as regards the method herein disclosed, provided the step or steps stated by any of the following claims, or the equivalent of such stated step by steps be employed.

We therefore particularly point out and distinctly claim as our invention:—

1. A method of purifying hydroquinone and separating the same from other phenolic compounds which comprises treating an aqueous, alkaline, hydroquinone-containing solution, first with sulphur dioxide until said solution has a pH value of between 5.0 and 9.0, and then with a primary aromatic amine capable of forming a relatively insoluble salt with hydroquinone, separating the salt thereby precipitated, and decomposing the same to recover hydroquinone and the aromatic amine separately therefrom.

2. A method of purifying hydroquinone and separating the same from other phenolic compounds which comprises first treating an aqueous hydroquinone-containing solution with sulphur dioxide until said solution has a pH value of between 5.0 and 7.0, and then with a primary aromatic amine capable of forming a relatively insoluble salt with hydroquinone, separating the salt thereby precipitated, and decomposing the same to recover hydroquinone and the aromatic amine separately therefrom.

3. A method of purifying hydroquinone and separating the same from related compounds such as pyrocatechol, resorcinol, phenol and halogenated phenols, which comprises forming a relatively insoluble amine salt of hydroquinone by treating an aqueous hydroquinone-containing solution having a pH value of between 5.0 and 9.0, with one of the following class of primary aromatic amines;—aniline, para-toluidine, 2.4-dimethyl-aniline, para-anisidine, para-phenetidine, beta-naphthylamine and para-phenylene-diamine; separating the salt thereby precipitated, and decomposing the same to recover hydroquinone and the aromatic amine separately therefrom.

4. A method of purifying hydroquinone and separating the same from other phenolic compounds which comprises forming a relatively insoluble amine salt of hydroquinone by treating an aqueous hydroquinone-containing solution having a pH value of between 5.0 and 9.0 with one of the following class of primary aromatic amines;—aniline, para-toluidine and 2.4-dimethyl-aniline; separating the salt thereby precipitated, decomposing said salt by heating the same to a temperature of about 80° C. or higher in an organic solvent having a boiling point of about 80° C. or higher and in which solvent such salt and the free aromatic amine derivable therefrom are both relatively soluble, but in which hydroquinone itself is relatively insoluble, cooling the reaction mixture, separating the precipitated hydroquinone and recovering the aromatic amine from the mother liquor.

5. A method of purifying hydroquinone and separating the same from other phenolic compounds which comprises forming a relatively insoluble amine salt of hydroquinone by treating an aqueous, alkaline, hydroquinone-containing solution, first with sulphur dioxide until said solution has a pH value of between 5.0 and 9.0, and then with one of the following class of primary aromatic amines;—aniline, para-toluidine and 2.4-dimethyl-aniline, separating the salt thereby precipitated, decomposing said salt by heating the same to a temperature of about 80° C. or higher in an organic solvent having a boiling point of about 80° C. or higher and in which solvent such salt and the free aromatic amine derivable therefrom are both relatively soluble, but in which hydroquinone itself is relatively insoluble, cooling the reaction mixture, separating the precipitated hydroquinone, and recovering the aromatic amine from the mother liquor.

6. A method of purifying hydroquinone and separating the same from other phenolic compounds which comprises forming a relatively insoluble amine salt of hydroquinone by treating an aqueous, hydroquinone-containing solution, first with sulphur dioxide until said solution has a pH value of between 5.0 and 7.0, and then with one of the following class of primary aromatic amines;—aniline, para-toluidine and 2.4-dimethyl-aniline, separating the salt thereby precipitated, decomposing said salt by heating the same to a temperature of about 80° C. or higher, in an organic solvent having a boiling point of about 80° C. or higher and in which solvent such salt and the free aromatic amine derivable therefrom are both relatively soluble, but in which hydroquinone itself is relatively insoluble, cooling the reaction mixture, separating the precipitated hydroquinone, and recovering the aromatic amine from the mother liquor.

7. A method of purifying hydroquinone and separating the same from related compounds such as pyrocatechol, resorcinol, phenol and halogenated phenols, which comprises forming a relatively insoluble amine salt of hydroquinone by treating an aqueous, hydroquinone-containing solution, having a pH value of between 5.0 and 9.0, with one of the following class of primary aromatic amines;—aniline, para-toluidine and 2.4-dimethyl-aniline, separating the salt thereby precipitated, decomposing said salt by heating the same to a temperature of about 80° C. or higher in one of the following class of organic solvents;—benzene, monochlorobenzene, ortho-dichloro-benzene, 1.2.4-trichloro-benzene, toluene, ethylene chloride and propylene chloride; cooling the reaction mixture, separating the precipitated hydroquinone, and recovering the aromatic amine from the mother liquor.

8. A method of purifying hydroquinone and separating the same from other phenolic compounds which comprises treating an aqueous hydroquinone-containing solution with a primary aromatic amine capable of forming a relatively insoluble salt with hydroquinone, separating the salt thereby precipitated, decomposing said salt by heating the same to a temperature of about 80° C. or higher in an organic solvent having a boiling point of about 80° C. or higher and in which solvent such salt and the free aromatic amine derivable therefrom are both relatively soluble but in which hydroquinone itself is relatively insoluble, cooling the reaction mixture, and separating the precipitated hydroquinone.

Signed by us this 30 day of July, 1931.
EDGAR C. BRITTON.
SHAILER L. BASS.
NORMAN ELLIOTT.